UNITED STATES PATENT OFFICE.

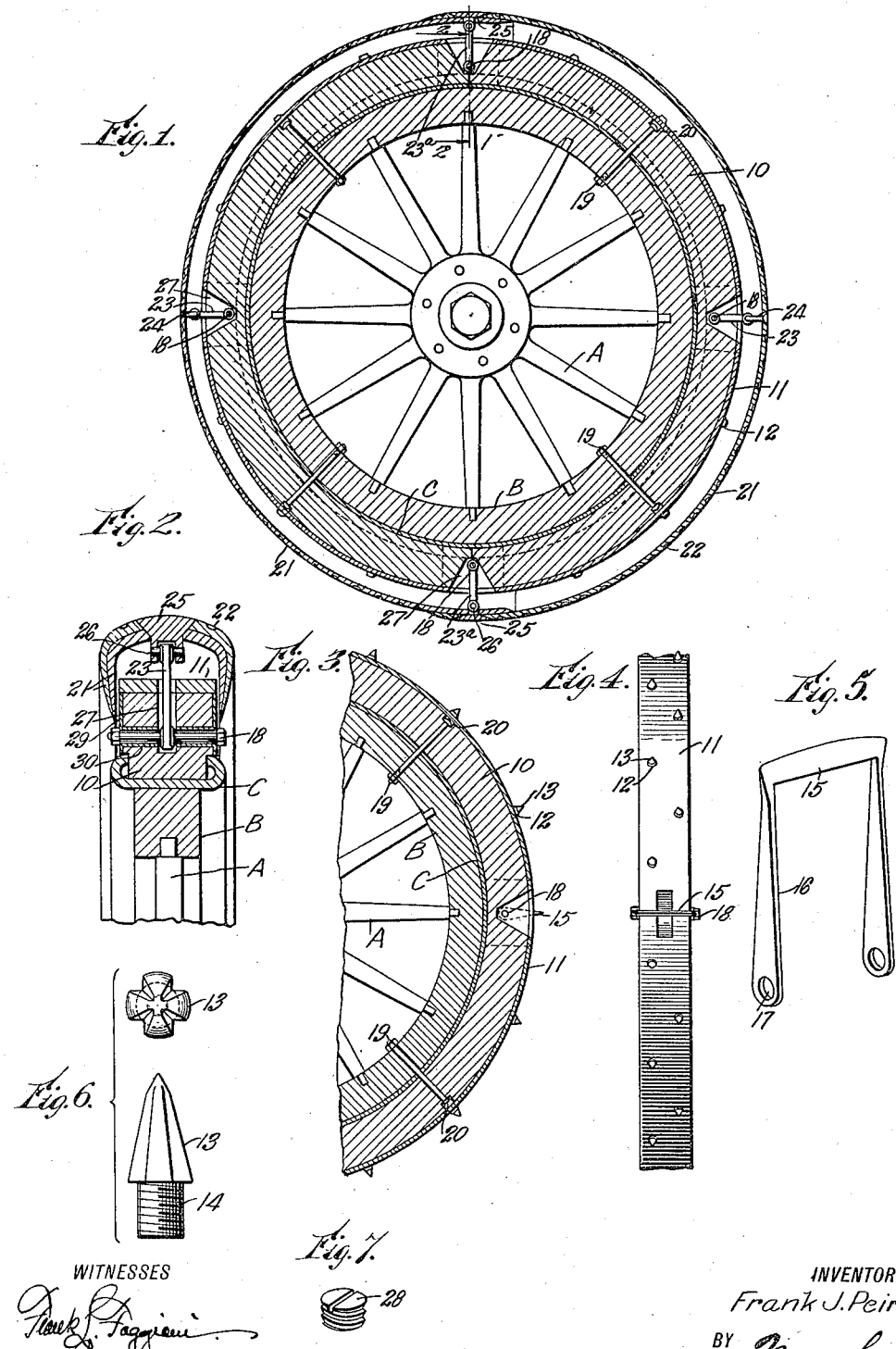

FRANK J. PEIRCE, OF PARKERS LANDING, PENNSYLVANIA.

VEHICLE-TIRE.

1,320,343.　　　　Specification of Letters Patent.　　Patented Oct. 28, 1919.

Application filed June 18, 1918. Serial No. 240,640.

*To all whom it may concern:*

Be it known that I, FRANK J. PEIRCE, a citizen of the United States, and a resident of Parkers Landing, in the county of Armstrong and State of Pennsylvania, have invented a new and Improved Vehicle-Tire, of which the following is a description.

My invention relates to tires for vehicles including automobiles and trucks, and more particularly to a tire adapted to be employed in lieu of pneumatic tires.

An object of my invention is to provide a tire which as a whole will include elements whereby the tire is convertible for use either as a summer tire or as a winter tire.

An important object of the invention also is to provide winter tire elements that will effectively prevent slipping on icy ground.

A further important object of the invention is to coördinate the winter and summer tires so that the latter at the exterior will be resilient and may readily be applied to the wheel without removal of the winter tire as a whole.

Reference is to be had to the accompanying drawings forming a part of this specification, it being understood that the drawings are merely illustrative of one example of the invention.

Figure 1 is a vertical section of my improved tire including a summer tire, certain elements pertaining to the winter tire having been removed;

Fig. 2 is a cross section on the line 2—2, Fig. 1;

Fig. 3 is a fragmentary vertical section with the summer tire removed and the complete elements of the winter tire in place;

Fig. 4 is an edge view of a portion of the winter tire;

Fig. 5 is a perspective view of a detachable creeper element pertaining to the winter tire;

Fig. 6 represents an end view and a side elevation of the removable calk of the winter tire;

Fig. 7 is a perspective view of a screw plug adapted to be employed in the calk sockets of the winter tire after the removal of the calks.

My invention is applicable to any approved vehicle wheel A, the view showing a spoked wheel having a felly B and a clencher rim C as employed on automobiles. In carrying out my invention I provide an auxiliary wood rim 10 adapted to be received on the clencher rim C, said rim 10 being formed in two or more sections for ready application to the rim C. On the wood rim 10 is a metallic tire 11 having sockets 12 punched therein and adapted to receive threaded shanks 14 of calks 13, the threads of the shanks being preferably left-hand threads. In addition to the calks 13 I provide, to complete the winter tire elements of the attachment, creepers 15 consisting of a sharpened cross bar adapted to lie transversely outside of the tire 11, said creepers each having, as best seen in Fig. 5, side arms 16 extending radially inward and formed at their inner ends with bolt holes 17 adapted to receive bolts 18 extending transversely through the auxiliary wood rim 10, whereby the creeper elements are securely fastened in position. The sockets 12 and the calks 13 are preferably in staggered annular series as best seen in Fig. 4 and the creepers 15 are employed in suitable number about the rim, there being indicated in Fig. 1, four bolts 18 to secure the creepers. In said Fig. 1, however, the creepers 15 are omitted as will be the case in securing the summer tire by utilizing the bolts 18 for the purpose. Radial bolts 19 extend radially through the auxiliary rim 10, felly B and clencher rim C securely holding them in their proper relative position. The winter rim 11 is preferably held in position on the auxiliary rim 10 by heating the rim and shrinking thereon. The heads of the bolts 19 are accommodated in countersinks 20 in the auxiliary wood rim 10.

The summer tire 21 is made of two or more segmental sections of spring steel, overlapping at their ends, two semi-circular segments being shown in Fig. 1, and said tire has a suitable roughened tread surface, there being indicated depressions 22 for the purpose. The summer rim 21 is secured in position by a suitable number of radial links 23, 23$^a$, all the links being pivotally secured at their inner ends by the transverse bolts 18. The links 23$^a$ alternate with the links 23, which latter are pivotally secured to fixed eye bolts 24 on the inner side of the rim 21. The links 23$^a$ are located at the overlapped ends of the sections of the tire 21, through which overlapped ends headed fasteners 25 extend, the inner ends of said fasteners being secured to the outer ends of the links 23$^a$ by transverse pins 26, the arrangement serving to facilitate the attaching and detaching of the summer tire 21. At their inner ends the links 23, 23ᵃ extend into radial slots 27 formed in the wood rim 10 and summer tire 11, said slots flaring outwardly whereby they will accommodate the movements of the links 23, 23ᵃ in the plane of the tire, following the flexure of the spring tire 21.

When the summer tire 21 is employed the calks 13 are not in position, and screw caps, one of which is shown in Fig. 7 and designated 28 may be employed in the sockets 12 to exclude dirt therefrom. To reinforce the wool rim 10 at the slots 27, side plates 29 are provided at the opposite sides of said wood rim, at the slotted portions, as seen in Fig. 2 and from said plates bushings 30 extend at the inner side into the holes for the bolts 18.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A convertible tire, and means to secure the same, including an auxiliary rim and clencher rim adapted to be applied to a wheel, a metal tire on said auxiliary rim, radial bolts adapted to extend through said auxiliary rim, clencher rim and felly to secure the same, a spring metal tire outside of and spaced from the first tire, radial links pivotally secured to the second tire, the first tire and the auxiliary rim having outwardly flaring radial slots into which the said links extend, and transverse bolts in said auxiliary rim at said slots, said links being pivotally connected at their inner ends with the said transverse bolts.

2. A tire and means to secure the same, including an auxiliary rim, a metallic tire thereon, means to detachably secure said auxiliary rim and tire jointly on a wheel, said rim and tire having outwardly flaring radial slots, a tire of spring metal outside and spaced from said first tire, radial links pivotally connected at their outer ends to said second tire and extending inwardly therefrom into said slots, and transverse bolts extending through said auxiliary rim, the inner ends of said links being pivotally connected with said transverse bolts.

3. In a tire and securing means therefor, an auxiliary rim, means to secure the same on a wheel, said rim having outwardly flaring radial slots, a spring metal tire outside of and spaced from said rim, links pivotally connected to said tire and extending therefrom radially inward into said slots, and transverse bolts extending through said rim, said links at their inner ends being pivotally connected with said bolts to have movement in said slots in the plane of the rim in response to the flexure of the metallic tire.

4. A tire including segmental sections having overlapped ends, and means to secure the same, said means including radial elements, certain of said elements being secured to the segments between the ends thereof, and fastening members removably extending through the overlapped ends of the segments and pivotally connected with the other radial elements.

FRANK J. PEIRCE.